US008363383B2

(12) United States Patent
Sato et al.

(10) Patent No.: US 8,363,383 B2
(45) Date of Patent: Jan. 29, 2013

(54) DIELECTRIC CERAMIC COMPOSITION AND CERAMIC ELECTRONIC COMPONENT

(75) Inventors: Jun Sato, Tokyo (JP); Takashi Kojima, Tokyo (JP); Tomoya Shibasaki, Tokyo (JP); Osamu Kido, Tokyo (JP)

(73) Assignee: TDK Corporation, Tokyo (JP)

( * ) Notice: Subject to any disclaimer, the term of this patent is extended or adjusted under 35 U.S.C. 154(b) by 101 days.

(21) Appl. No.: 13/109,379

(22) Filed: May 17, 2011

(65) Prior Publication Data

US 2011/0286146 A1 Nov. 24, 2011

(30) Foreign Application Priority Data

May 20, 2010 (JP) ................................. 2010-116658

(51) Int. Cl.
*H01G 4/06* (2006.01)
(52) U.S. Cl. .................. 361/321.2; 361/321.1; 361/311; 361/313; 361/306.1; 361/306.3
(58) Field of Classification Search ............... 361/321.1, 361/321.2, 321.4, 311–313, 301.2, 306.1, 361/306.3, 309; 501/134, 135, 137, 138, 501/139
See application file for complete search history.

(56) References Cited

U.S. PATENT DOCUMENTS

| 5,995,360 | A | 11/1999 | Hata et al. |
| 6,226,172 | B1 | 5/2001 | Sato et al. |
| 6,243,254 | B1 * | 6/2001 | Wada et al. ................ 361/311 |
| 6,245,433 | B1 * | 6/2001 | Nakamura et al. ............ 428/469 |
| 6,559,084 | B1 * | 5/2003 | Fujikawa et al. ............ 501/139 |
| 6,809,052 | B2 * | 10/2004 | Horie et al. .................... 501/138 |
| 6,917,513 | B1 * | 7/2005 | Kim et al. .................. 361/321.2 |
| 7,439,203 | B2 * | 10/2008 | Ito et al. ........................ 501/139 |
| 7,580,242 | B2 * | 8/2009 | Aman et al. ............... 361/321.5 |
| 7,790,645 | B2 * | 9/2010 | Seki et al. ..................... 501/139 |

FOREIGN PATENT DOCUMENTS

| JP | A-10-223471 | 8/1998 |
| JP | A-2000-154057 | 6/2000 |
| JP | A-2001-031467 | 2/2001 |
| JP | A-2003-277139 | 10/2003 |
| JP | A-2011-155123 | 8/2011 |

* cited by examiner

*Primary Examiner* — Nguyen T Ha

(74) *Attorney, Agent, or Firm* — Oliff & Berridge, PLC

(57) ABSTRACT

A dielectric ceramic composition includes $BaTiO_3$ as a main component; as subcomponents, with respect to 100 moles of $BaTiO_3$, 0.9 to 2.0 moles of an oxide of RA in terms of $RA_2O_3$, where RA is at least one selected from Dy, Gd and Tb; 0.3 to 2.0 moles of an oxide of RB in terms of $RB_2O_3$, where RB is at least one selected from Ho and Y; 0.75 to 2.5 moles of an oxide of Yb in terms of $Yb_2O_3$; and 0.5 to 2.0 moles of an oxide of Mg in terms of Mg. when contents of oxide of RA, oxide of RB and oxide of Yb with respect to 100 moles of $BaTiO_3$ are defined as "α", "β" and "γ", respectively, "α", "β" and "γ" satisfy relations of $0.66 \leq (\alpha/\beta) \leq 3.0$ and $0.85 \leq (\alpha+\beta)/\gamma \leq 2.4$. According to the present invention, a dielectric ceramic composition having good properties can be provided.

11 Claims, 1 Drawing Sheet

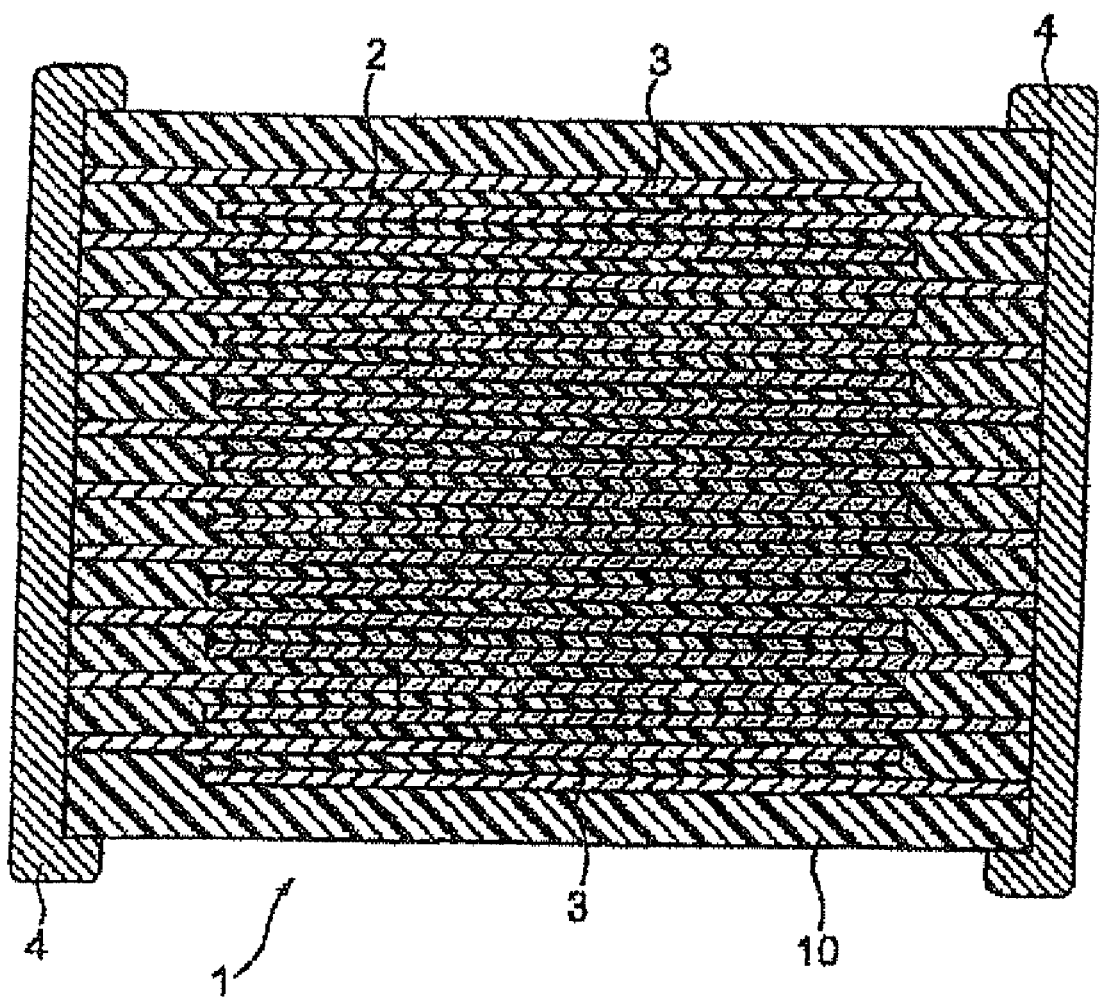

DIELECTRIC CERAMIC COMPOSITION AND CERAMIC ELECTRONIC COMPONENT

BACKGROUND OF THE INVENTION

Field of the Invention

The present invention relates to a dielectric ceramic composition and a ceramic electronic component in which said dielectric ceramic composition is applied to a dielectric layer, and particularly, relates to a dielectric ceramic composition having good characteristics and a ceramic electronic component in which said dielectric ceramic composition is applied, even when the dielectric layer is made thinner.

A multilayer ceramic capacitor as an example of ceramic electronic components is widely used as electronic component having compact size, high performance and high reliability, and the number used in electric and electronic apparatuses is large. In recent years, along with downsizing such apparatuses and improvement of the performance thereof, the demand to further make compact, the demands for the higher performance and higher reliability of a multilayer ceramic capacitor is growing.

In order to respond to such demands, for example, Japanese Patent Gazette No. 3091192 describes a dielectric ceramic composition including a barium titanate, two kinds of rare earth oxides and other metal oxides, and a multilayer ceramic capacitor having a dielectric ceramic layer constituted by the dielectric ceramic composition. The document also describes that this multilayer ceramic capacitor shows good high temperature accelerated lifetime and the like while satisfying X8R characteristic.

In the meantime, it is well-known that when the dielectric layer is made thinner, even when the same voltage is applied the electric field intensity applied to the dielectric layer becomes larger; thus insulation resistance may be deteriorated.

A thickness of the dielectric layer of the multilayer ceramic capacitor described in examples of the Japanese Patent Gazette No. 3091192 is 10 μm. However, it is not clear whether insulation resistance and its lifetime is good or not even when this dielectric layer further thinner.

BRIEF SUMMARY OF THE INVENTION

The present invention has been made by considering such situation, and a purpose of the invention is to provide a dielectric ceramic composition, and a ceramic electronic component in which the dielectric ceramic composition is applied to a dielectric layer having good characteristics.

In order to achieve the above mentioned purposes, a dielectric ceramic composition according to the present invention includes a barium titanate as a main component; as subcomponents, with respect to 100 moles of the barium titanate, 0.9 to 2.0 moles of an oxide of RA in terms of $RA_2O_3$, where RA is at least one selected from Dy, Gd and Tb; 0.3 to 2.0 moles of an oxide of RB in terms of $RB_2O_3$, where RB is at least one selected from Ho and Y; 0.75 to 2.5 moles of an oxide of Yb in terms of $Yb_2O_3$; and 0.5 to 2.0 moles of an oxide of Mg in terms of Mg. When contents of the oxide of RA, the oxide of RB and the oxide of Yb with respect to 100 moles of the barium titanate are defined as "α", "β" and "γ", respectively, the "α", "β" and "γ" satisfy relations of $0.66 \leq (\alpha/\beta) \leq 3.0$ and $0.8 \leq (\alpha+\beta)/\gamma \leq 2.4$.

In the present invention, by setting contents of each component within the above range, a dielectric ceramic composition having various good characteristics can be obtained even when a dielectric layer is made thinner. Particularly, by dividing rare earth elements into three groups and setting content ratios thereof within the above ranges, the degree of solute rare earth elements in $BaTiO_3$ can be controlled. As a result, conflicting characteristics can be accomplished.

Preferably, the dielectric ceramic composition further includes, as a subcomponent, 0.03 to 0.10 mole of an oxide of V in terms of V with respect to 100 moles of the barium titanate.

Preferably, the dielectric ceramic composition further includes, as a subcomponent, 0.10 to 0.30 mole of an oxide of Mn in terms of Mn with respect to 100 moles of the barium titanate.

Preferably, the dielectric ceramic composition further includes, as a subcomponent, 0.60 $(\beta+\beta+\gamma)$ to 1.0 $(\alpha+\beta+\gamma)$ moles of a composite oxide shown by a compositional formula of $(Ba, Ca)_xSiO_{2+x}$ in terms of $SiO_2$ with respect to 100 moles of the barium titanate. Also, "x" in the compositional formula is 0.5 to 1.0.

The dielectric ceramic composition according to the present invention can further improve the characteristics by including the above components.

Preferably, the RA is Tb. Also, preferably, the RB is Y. By having this constitution, the effect of the present invention can be further improved.

Also, a ceramic electronic component according to the present invention has a dielectric layer composed of any one of the above mentioned dielectric ceramic compositions and an electrode and the dielectric layer has a thickness of 5 μm or less. As for the ceramic electronic component, although it is not particularly limited, a multilayer ceramic capacitor, a piezo element, a chip inductor, a chip varistor, a chip thermistor, a chip resistance and other surface mounted device (SMD) chip type electronic components may be mentioned as the examples.

BRIEF DESCRIPTION OF THE DRAWINGS

FIG. 1 is a cross sectional view of a multilayer ceramic capacitor according to one embodiment of the present invention.

DETAILED DESCRIPTION OF THE INVENTION

Below, the present invention will be explained based on embodiments shown in the drawing.

(Multilayer Ceramic Capacitor 1)

As shown in FIG. 1, a multilayer ceramic capacitor 1 as one example of ceramic electronic component has a capacitor element body 10 in which a dielectric layer 2 and an internal electrode layer 3 are alternately stacked. The internal electrode layers 3 are stacked so that each end face is alternately exposed to surfaces of the two opposed end portions of the capacitor device body 10. Also, the pair of external electrodes 4 is formed at both end portions of the capacitor element body 10, and connected with the exposed end faces of the alternately-stacked internal electrode layers 3 to form a capacitor circuit.

Although the shape of the capacitor element body 10 is not particularly limited, as shown in FIG. 1, normally, it is formed as a rectangular parallelepiped shape. Also, a dimension thereof is not particularly limited, and it may be decided appropriately depending on the use.

(Dielectric Layer 2)

The dielectric layer 2 is composed of a dielectric ceramic composition according to the present embodiment. The dielectric ceramic composition includes a barium titanate as a main component. The dielectric ceramic composition also includes dielectric particles whose main component is $BaTiO_3$.

In the present embodiment, barium titanate is preferably shown by, for example, compositional formula $Ba_mTiO_{2+m}$, where "m" is $0.99 \leq m \leq 1.01$.

The dielectric ceramic composition according to the present embodiment includes, in addition to the barium titanate, an oxide of RA, an oxide of RB, an oxide of Yb and an oxide of Mg, as subcomponents. In the present embodiment, specific rare earth elements are divided into three groups ("RA", "RB" and Yb).

When a content of the oxide of RA is defined as "α", the "α" is 0.9 to 2.0 moles, preferably 1.0 to 1.5 moles, in terms of $RA_2O_3$ with respect to 100 moles of barium titanate. When the "α" is too much, capacitance-temperature change rate (change rate of capacitance with respect to temperature) tends to be larger. On the other hand, when it is too little, high temperature accelerated lifetime tends to be shorter. The RA is at least one selected from Dy, Gd and Tb, and particular preferably Tb.

When a content of the oxide of RB is defined as "β", the "β" is 0.3 to 2.0 moles, preferably 0.5 to 1.5 moles, in terms of $RB_2O_3$ with respect to 100 moles of barium titanate. When "β" is too much, firing temperature tends to be higher. On the other hand, when it is too little, capacitance-temperature change rate tends to become large. The RB is at least one selected from Ho and Y, and particularly preferably Y.

When a content of the oxide of Yb is defined as "γ", the "γ" is 0.75 to 2.5 moles, preferably 1.0 to 2.0 moles, in terms of $Yb_2O_3$ with respect to 100 moles of barium titanate. When "γ" is too much, a high temperature accelerated lifetime tends to be shorter. On the other hand, when it is too little, the capacitance-temperature change rate tends to become large.

Also, the "α", "β" and "γ" satisfy relations of $0.66 \leq \alpha/\beta \leq 3.0$ and $0.8 \leq (\alpha+\beta)/\gamma \leq 2.4$. More preferably, they satisfy relations of $1.0 \leq \alpha/\beta \leq 3.0$ and $1.0 \leq (\alpha+\beta)/\gamma \leq 2.0$. When they do not satisfy the above relations, it tends to become difficult to achieve a good balance between temperature characteristic and the high temperature accelerated lifetime.

In the present embodiment, metal elements of the subcomponents, for example, the RA, RB and Yb are solid-soluted in a dielectric particle whose main component is the $BaTiO_3$. Note that, the dielectric particle may have so-called core-shell structure or may have a totally solid-solution type structure.

In the present embodiment, specific rare earth elements are divided into three groups (RA, RB and Yb). Rare earth elements, normally, substitute atom of A site of $BaTiO_3$ (Ba) and are solid-soluted into $BaTiO_3$. When the difference between the effective ionic radius of the rare earth elements and that of the A site atom is small, the rare earth elements can substitute A site (be solid-soluted) easily. When the difference is large, the rare earth elements become difficult to substitute A site (solid-soluted).

In the present embodiment, the elements having small difference in ionic radius between A site atom corresponds to RA, and the elements having large difference in ionic radius between A site atom corresponds to Yb. The degree of solid solute RA into $BaTiO_3$ is different from that of solid solute Yb. The RA tends to be easily solid-soluted into $BaTiO_3$ completely while the Yb tends to be solid-soluted only in peripheral of $BaTiO_3$ and forms so-called core-shell structure. Due to this, RA improves lifetime of the dielectric ceramic composition, however, the temperature characteristic tends to be deteriorated. On the other hand, Yb improves the temperature characteristic of the dielectric ceramic composition, however, lifetime tends to be deteriorated.

Therefore, it would appear to achieve a good balance between the temperature characteristic and the lifetime by controlling the contents and ratios of RA and Yb, to prevent RA from being excessively solid-soluted into $BaTiO_3$ with addition of Yb. However, this was not enough to respond to the demands to further make compact, higher performance and higher reliability of a ceramic electronic component.

Thus, the present embodiment includes rare earth elements (RB) which have intermediate effective ionic radius between that of RA and that of Yb. This RB can improve lifetime of dielectric ceramic composition, although such effect is not so much as that of RA. On the other hand, the temperature characteristic tends to depend on the relation of content between RB and RA.

Therefore, by setting the contents of RA (α) and RB (β) within the specific ranges, and by further setting the contents of RA and RB (α+β) which improves lifetime, and the content of Yb (γ) which improves temperature characteristic within the specific range, the good balance between the temperature characteristic and the lifetime can be achieved.

A content of an oxide of Mg is 0.5 to 2.0 moles, preferably 0.8 to 1.5 moles, in terms of Mg with respect to 100 moles of barium titanate. When the content of the oxide of Mg is too much, the high temperature accelerated lifetime tends to become shorter. On the other hand, when it is too little, the firing temperature tends to become higher.

It is preferable that the dielectric ceramic composition according to the present embodiment further includes, as subcomponents, an oxide of V, an oxide of Mn and a composite oxide shown by compositional formula $(Ba, Ca)_xSiO_{2+x}$.

A content of the oxide of V is preferably 0.03 to 0.10 mole in terms of V with respect to 100 moles of barium titanate. When the content of the oxide of V is too much, CR product tends to be lower. On the other hand, when it is too little, the high temperature accelerated lifetime tends to become shorter.

A content of the oxide of Mn is preferably 0.10 to 0.3 mole in terms of Mn with respect to 100 moles of barium titanate. When the content of the oxide of Mn is too much or too little, the high temperature accelerated lifetime tends to become shorter.

The composite oxide shown by compositional formula $(Ba, Ca)_xSiO_{2+x}$ mainly has a role of sintering aids. When a content of the composite oxide is defined as "a", the "a" is 0.6 $(\alpha+\beta+\gamma)$ to 1.0 $(\alpha+\beta+\gamma)$ moles in terms of $SiO_2$ with respect to 100 moles of $BaTiO_3$. That is, the content of the composite oxide (a) changes depending on the contents of the above rare earth oxides $(\alpha+\beta+\gamma)$. When the contents of rare earth oxides increase, the dielectric ceramic composition becomes difficult to sinter; thus by controlling the content of the composite oxide as above, the firing temperature can be maintained low. When the content of the composite oxide is too much, specific permittivity tends to decrease. On the other hand, when it is too little, the sinterability tends to decrease.

Also, "x" in the compositional formula $(Ba, Ca)_xSiO_{2+x}$ is preferably 0.5 to 1.0. Furthermore, molar ratio of Ba to Si is preferably 50% or more.

Although a crystal particle size of the dielectric particle included in the dielectric ceramic composition according to the present embodiment is not particularly limited, in order to respond to the demand for making the dielectric layer thinner, it is preferably 0.1 to 0.3 μm. Also, the dielectric ceramic composition according to the present embodiment may further include other components depending on desired characteristics.

A thickness of the dielectric layer 2 is preferably 3 to 7 μm or so per layer, more preferably 3 to 5 μm or so per layer in order to respond to the demand for making the dielectric layer thinner.

Although the number of stacked layers of the dielectric layer 2 is not particularly limited, it is preferably 20 or more, more preferably 50 or more, particularly preferably 100 or more. An upper limit of the number of stacked layers is not particularly limited, however it is for example, 2000 and so on.

(Internal Electrode Layer 3)

Although a conductive material included in the internal electrode layer 3 is not particularly limited, comparatively inexpensive base metal may be used, because the material constituting the dielectric layer 2 has resistance to reduction. As for the base metal of the conductive material, Ni or Ni alloy is preferable. As for the Ni alloy, an alloy between Ni of at least one kind of elements selected from Mn, Cr, Co and Al is preferable, and Ni content amount in the alloy is preferably 95 wt % or more. Note that, in the Ni or Ni alloy, 0.1 wt % or below or so of various miner component such as P and the like may be included. Although a thickness of the internal electrode layer 3 may be suitably decided depending on a purpose of use and the like, it is normally preferably 0.1 to 3 μm, particularly preferably 0.2 to 2.0 μm or so.

(External Electrode 4)

Although a conductive material included in an external electrode 4 is not particularly limited, in the present embodiment, inexpensive Ni, Cu and their alloys may be used. A thickness of the external electrode may be suitably decided depending on a purpose of use and the like, and normally 10 to 50 μm or so is preferable.

(Producing Method for Multilayer Ceramic Capacitor 1)

A multilayer ceramic capacitor 1 of the present embodiment is produced by, as similar to a conventional multilayer ceramic capacitor, producing a green chip by a normal printing method or sheet method using a paste, then firing thereof, and baking after the external electrode is printed or transferred. Below, a method for producing will be explained specifically.

First, the dielectric material for forming the dielectric layer is prepared, and made into a paste so as to prepare a dielectric layer paste.

As for the dielectric material, first, a material of barium titanate, materials of oxides of rare earth elements (RA, RB and Yb) and a material of oxide of Mg are prepared. As for these materials, the above oxides of the components, the mixtures thereof or composite oxide thereof can be used. Also, various compounds which become the above oxides or composite oxide by firing, for example, such as carbonate, oxalate, nitrate, hydroxide or organic metal compounds may be suitably selected and used, or mixtures thereof may be used.

The material of barium titanate produced by various methods such as various liquid phase methods (for example, oxalate method, hydrothermal synthesis method, alkoxide method, sol-gel method and the like) as well as so-called solid phase method can be used.

Furthermore, when components other than barium titanate, oxides of rare earth elements (RA, RB and Yb) and oxide of Mg are included in the dielectric layer, as for materials of the components, oxides of these components, the mixture thereof or the composite oxide thereof can be used as similar to the above. Also, various compounds which become the above oxides or composite oxide by firing can be used.

A content of each compound in the dielectric material may be decided so that it becomes the composition of the above mentioned dielectric ceramic composition after firing. Average particle size of the dielectric material is, normally, 0.1 to 1 μm or so before the material is made into a paste.

The dielectric layer paste may be an organic type paste obtained by kneading the dielectric material and an organic vehicle, or it may be a water-based paste.

The organic vehicle is obtained by dissolving a binder in an organic solvent. The binder used for the organic vehicle is not particularly limited, and may be suitably selected from various normal binders such as ethyl cellulose, polyvinyl butyral and the like. Also, the organic solvent is not particularly limited, and may be suitably selected from various solvents such as terpineol, butyl carbitol, acetone, toluene and the like depending on the applied methods such as printing method or sheet method.

Also, when the dielectric layer paste is prepared as the water-based paste, the water-based vehicle obtained by dissolving a water soluble binder, a dispersion agent or so in water, and the dielectric material may be kneaded. The water-soluble binder used for the water-based vehicle is not particularly limited, and for example, polyvinyl alcohol, cellulose, water-soluble acrylic resin and the like can be used.

An internal electrode layer paste is obtained by kneading the conducting materials constituted by the above mentioned various conducting metals and the alloys, or the various oxides, organic metal compound and resinate, etc., which become the above-mentioned conducting materials after firing, with the above-mentioned organic vehicle. Also, the internal electrode layer paste may include an inhibitor. As for the inhibitor, although not particularly limited, it is preferable that it has a similar composition as the main component.

The external electrode paste can be prepared as similar to the above mentioned internal electrode layer paste.

A content of the organic vehicle in each of the above mentioned paste is not particularly limited, and may be normal content, and for example, the binder may be 1 to 5 wt % or so, the solvent may be 10 to 50 wt % or so. Also, in the each paste, additives selected from various dispersant agent, plasticizer, dielectric, insulator and the like may be included if needed. A total amount thereof is preferably 10 wt % or less.

When using the printing method, the dielectric layer paste and the internal electrode layer paste are printed on a substrate such as PET and the like and stacked, the cut into a predetermined shape, thereby a green chip is obtained by removing from the substrate.

When using the sheet method, a green sheet is formed by using the dielectric layer paste, after printing the internal electrode layer paste thereon, these are stacked and cut into a predetermined shape so as to obtain a green chip.

Binder removal treatment is performed to the green chip, before firing. As for the binder removal conditions, a temperature rising rate is preferably 5 to 300° C./hr, a holding temperature is preferably 180 to 400° C. and a temperature holding time is preferably 0.5 to 24 hrs. Also, binder removal atmosphere is air or at reduced atmosphere.

After the binder removal treatment, the green chip is fired. A temperature rising rate at firing is preferably 100 to 500° C./hr. A holding temperature at firing is preferably 1300° C. or less, more preferably 1200 to 1280° C., and a holding time is preferably 0.5 to 8 hrs, more preferably 1.0 to 4.0 hrs. In the present embodiment, by having the above mentioned composition as composition of the dielectric ceramic composition, the holding temperature can be set to 1300° C. or less. If the holding temperature is below the range, the densification becomes insufficient; and if it exceeds this range, the breakage of the electrode due to the abnormal sintering of the internal electrode layer, the deterioration of the capacitance-temperature characteristic due to the dispersion of the constitutional material of the internal electrode layer, or a reduction of the dielectric ceramic composition tend to occur.

Firing atmosphere is preferably reduced atmosphere, as for an atmosphere gas, for example, a wet mixture gas of $N_2$ and $H_2$ may be preferably used.

Also, an oxygen partial pressure when firing may be suitably decided depending on a kind of the conductive material in the internal electrode layer paste, When using base metal such as Ni or Ni alloy and the like, the oxygen partial pressure in the firing atmosphere is preferably $10^{-14}$ to $10^{-10}$ MPa. If the oxygen partial pressure is below the range, the conducting material of the internal electrode layer may have abnormal sintering which results in a breakage thereof. Also, if the oxygen partial pressure exceeds the range, the internal electrode layer tends to oxidize. A temperature descending rate is preferably 50 to 500° C./hr.

It is preferable to perform an annealing to the capacitor element body after firing under the reduced atmosphere. The annealing is the treatment for a reoxidation of the dielectric layer, and thereby the reliability is improved, because IR lifetime (lifetime of insulation resistance) can be made extremely longer.

An oxygen partial pressure in the annealing atmosphere is preferably $10^{-9}$ to $10^{-5}$ MPa. When the oxygen partial pressure is less than the above range, the reoxidation of the dielectric layer is difficult; and when exceeding the above range, the oxidation of the internal electrode layer tends to progress.

Also, a holding temperature at the annealing is preferably 1100° C. or below, particularly preferably 1000 to 1100° C. When the holding temperature is less than the above range, the dielectric layer may not be sufficiently oxidized. As a result, IR is low and IR lifetime can easily be shortened. On the other hand, when the holding temperature exceeds the above range, not only a capacitance is reduced due to oxidization of the internal electrode layer, but also the capacitance-temperature characteristic is deteriorated, decrease in IR and reduction of IR lifetime can easily occur. Note that, the annealing can only be constituted by the temperature rising process and temperature descending process. Namely, the temperature holding time may be 0. In this case, the holding temperature is same as a maximum temperature.

As for other annealing conditions, a temperature holding time is preferably 0 to 20 hrs and a temperature descending rate is preferably 50 to 500° C./hr. Also, as for an atmosphere gas of the annealing, for example, it is preferable to use wet $N_2$ gas and the like.

In the above mentioned binder removal treatment, firing and annealing, for example, a wetter and the like may be used in order to wet the $N_2$ gas and mixture gas and the like. In this case, a water temperature is preferably 5 to 75° C. or so.

The binder removal treatment, firing and annealing may be performed continuously or individually.

An end face polishing is conducted to a capacitor element body obtained as above, for example, by a barrel polishing or a sandblast, then an external electrode paste is printed to bake, and an external electrode 4 is formed. Then, if needed, a covering layer is formed on a surface of the external electrode 4 by plating and the like.

Thus produced multilayer ceramic capacitor of the present embodiment is used for various electronic components and the like by mounting the same on a print circuit board and the like by soldering or so.

The foregoing has been described with respect to an embodiment of the present invention, however, the present invention is not limited to the above mentioned embodiment at all, and various modifications can be made within escape of the present invention.

For example, in the above embodiment, a multilayer ceramic capacitor is mentioned as an example of a ceramic electronic component according to the present invention. However, such ceramic electronic component is not limited to a multilayer ceramic capacitor and may be any as far as it has the above composition.

EXAMPLES

Below, the present invention will be explained based on further detailed examples, however, the present invention is not limited thereto.

Example 1

First, $BaTiO_3$ powder as a material of main component, $Tb_2O_{3.5}$ powder as a material of oxide of RA, $Y_2O_3$ powder as a material of oxide of RB and $Yb_2O_3$ powder were prepared, respectively. Also, $MgCO_3$ powder as a material of oxide of Mg, MnO powder as a material of oxide of Mn, $V_2O_5$ powder as a material of oxide of V and $(Ba_{0.57}Ca_{0.43}) SiO_3$ powder as $(Ba, Ca)_x SiO_{2+x}$ were prepared, respectively.

Next, respective powder materials prepared in the above were weighed so that it becomes the amounts shown in Tables 1 to 3, and then mixed and pulverized by a ball mill for 10 hours followed by drying to obtain a dielectric material. Note that, in regards with sample 41, $Gd_2O_3$ powder was prepared as a material of oxide of RA. In regards with sample 42, $Dy_2O_3$ powder was prepared as a material of oxide of RA and $Ho_2O_3$ powder was prepared as a material of oxide of RB. Also, $MgCO_3$ will be included as MgO in dielectric ceramic composition after the firing.

Next, 100 parts by weight of the obtained dielectric material, 10 parts by weight of polyvinyl butyral resin, 5 parts by weight of dioctylphthalate (DOP) as a plasticizer and 100 parts by weight of alcohol as a solvent were mixed by a ball-mill and made into a paste, thereby a dielectric layer paste was obtained.

Also, 44.6 parts by weight of Ni particles, 52 parts by weight of terpineol, 3 parts by weight of ethylcellulose, 0.4 part by weight of benzotriazole were kneaded by triple roll mill and made into a paste, thereby an internal electrode layer paste was obtained.

Then, a green sheet was formed on a PET film so that a thickness of the green sheet becomes 7.0 μm after drying by using the dielectric layer paste prepared in the above. Next, after an electrode layer was printed thereon in a predetermined pattern by using the internal electrode layer paste, a sheet was removed from the PET film, thereby a green sheet having the electrode layer was made. Next, a plurality of green sheets having the electrode layer were stacked and adhered by pressure to form a green stacking body. The green stacking body was cut into a predetermined size to obtain a green chip.

Next, the binder removal treatment was carried out to the obtained green chip, then fired and annealed under the following conditions; thereby a sintered body to be an element body was obtained.

The binder removal treatment was performed under the condition of a temperature rising rate: 25° C./hr, a holding temperature: 260° C., a holding time: 8 hrs and atmosphere: in the air.

The firing was performed under a condition of a temperature rising rate: 200° C./hr, a holding temperature: 1200 to 1340° C., a holding time: 2 hrs and a temperature descending rate: 200° C./hr. Note that, an atmosphere gas was wet $N_2+H_2$ mixture gas and an oxygen partial pressure was adjusted to $10^{-12}$ MPa.

The annealing was performed under a condition of a temperature rising rate: 200° C./hr, a holding temperature: 1000° C., a holding time 2 hrs, a temperature descending rate: 200° C./hr and atmosphere gas: wet $N_2$ gas (oxygen partial pressure $10^{-7}$ MPa).

Note that, a wetter was used for wetting the atmosphere gas for the firing and annealing.

Next, after polishing an end face of the obtained sintered body by sandblast, Cu was coated as an external electrode thereby a multilayer ceramic capacitor sample shown in FIG. 1 was obtained. A size of the obtained capacitor sample was 3.2 mm×1.6 mm×0.6 mm, the thickness of the dielectric layer was 5.0 μm, the thickness of the internal electrode layer was 1.1 μm, and a number of the dielectric layer sandwiched by the internal electrode layer was set to 4.

For the obtained each capacitor sample, the specific permittivity, the CR product, the capacitance temperature characteristic and the high temperature accelerated lifetime (HALT) were measured by the methods shown below.

(Specific Permittivity ∈)

The specific permittivity ∈ (no unit) was calculated from a capacitance of the obtained capacitor sample measured at a reference temperature of 25° C. with a digital LCR meter (4274A made by YHP) under the condition of a frequency of 1 kHz and an input signal level (measurement voltage) of 1.0 Vrms. The higher the specific permittivity, the more preferable it is; and in the present example, samples in which the specific permittivity was 1300 or higher were determined as good. The results are shown in Tables 1 to 3.

(CR Product)

To the capacitor samples, the insulation resistance IR was measured after applying a direct-current voltage of 10 V/μm at 20° C. for 1 minute by using the insulation resistance tester (R8340A made by Advantest Corporation). The CR product was measured by obtaining a product of capacitance C (unit: μF) measured as explained above, and the insulation resistance IR (unit: MΩ). In the present examples, the samples in which the CR product was 500 or higher were determined as good and expressed as "good" in Tables 1 to 3 and other samples were expressed as "bad". The results are shown in Tables 1 to 3.

(Capacitance-Temperature Characteristic)

To the capacitor samples, a capacitance from −55 to 155° C. was measured to calculate a change rate ΔC of the capacitance, and it was evaluated whether or not the change rate satisfies the X8R characteristic of EIA standard. Namely, it was evaluated whether or not the change rate ΔC through out the above temperature range was within ±15%. The results are shown in Tables 1 to 3.

(High Temperature Accelerated Lifetime (HALT))

To the capacitor samples, the lifetime was measured by applying the direct-current voltage under the electric field of 40 V/μm at 200° C.; thereby the high temperature load lifetime was evaluated. In the present example, breakdown time was defined as the time from the beginning of the voltage application until the insulation resistance dropped by one digit and the mean time to failure (MTTF) calculated from Weibull analysis was defined as lifetime. Also, this high temperature accelerated lifetime evaluation was performed to 20 capacitor samples, thereby an average value of the lifetime was defined as the high temperature accelerated lifetime. In the present example, sample in which the lifetime was 1.5 hours or longer was determined as good. The results are shown in Tables 1 to 3.

Also, the samples having the firing temperature was 1300° C. or less were determined as good, in the Tables 1 to 3, the samples having the firing temperature was 1300° C. or less were expressed as "good", and the samples having the firing temperature was more than 1300° C. were expressed as "bad".

TABLE 1

| Sample No. | MgO in terms of Mg [mol] | $Tb_2O_3$ α [mol] | $Y_2O_3$ β [mol] | $Yb_2O_3$ γ [mol] | $(Ba,Ca)SiO_3$ a [mol] | MnO in terms of Mn [mol] | $V_2O_5$ in terms of V [mol] | α/β | (α + β)/γ | a/(α + β + γ) | Specific permittivity | CR product [μF · MΩ] | Capacitance-temperature change rate [%] | HALT [h] | Firing temperature |
|---|---|---|---|---|---|---|---|---|---|---|---|---|---|---|---|
| *1 | 1.21 | 1.35 | 4.00 | 1.25 | 4.00 | 0.17 | 0.05 | 0.34 | 4.28 | 0.61 | 1190 | good | −3.8 | 0.2 | good |
| *2 | 1.21 | 1.90 | 2.10 | 2.00 | 4.00 | 0.17 | 0.05 | 0.90 | 2.00 | 0.67 | 1260 | good | −8.4 | 1.4 | bad |
| 3 | 1.21 | 0.90 | 0.90 | 1.75 | 3.25 | 0.17 | 0.05 | 1.00 | 1.03 | 0.92 | 1650 | good | −9.3 | 2.3 | good |
| *4 | 1.21 | 2.00 | 0.20 | 1.25 | 4.00 | 0.17 | 0.05 | 10.00 | 1.76 | 1.16 | 1520 | good | −19.2 | 27.5 | good |
| *5 | 1.21 | 2.10 | 0.80 | 1.90 | 3.00 | 0.17 | 0.05 | 2.63 | 1.53 | 0.63 | 1290 | good | −14.2 | 6.7 | bad |
| 6 | 1.21 | 1.80 | 1.50 | 1.90 | 3.50 | 0.17 | 0.05 | 1.20 | 1.74 | 0.67 | 1365 | good | −11.3 | 2.5 | good |
| *7 | 1.21 | 0.80 | 0.40 | 1.90 | 3.00 | 0.17 | 0.05 | 2.00 | 0.63 | 0.97 | 1480 | good | −14.1 | 1.4 | good |
| *8 | 1.21 | 1.35 | 1.00 | 2.60 | 2.55 | 0.17 | 0.05 | 1.35 | 0.90 | 0.52 | 770 | good | −6.5 | 0.1 | good |
| 9 | 1.21 | 1.35 | 1.00 | 1.70 | 2.55 | 0.17 | 0.05 | 1.35 | 1.38 | 0.63 | 1435 | good | −10.4 | 2.9 | good |
| *10 | 1.21 | 0.90 | 0.50 | 0.60 | 2.55 | 0.17 | 0.05 | 1.80 | 2.33 | 1.28 | 1830 | good | −17.5 | 32.6 | good |
| 11 | 1.21 | 1.35 | 2.00 | 1.50 | 3.25 | 0.17 | 0.05 | 0.68 | 2.23 | 0.67 | 1495 | good | −8.5 | 1.9 | good |
| *12 | 2.06 | 0.00 | 0.00 | 4.26 | 3.00 | 0.38 | 0.50 | — | 0.00 | 0.70 | 1230 | bad | −5.2 | 0.1≧ | good |
| *13 | 2.06 | 0.00 | 2.00 | 2.00 | 3.00 | 0.38 | 0.01 | 0.00 | 1.00 | 0.75 | 1430 | good | −11.1 | 0.3 | bad |

Samples with "*" denote samples out of the range of the present invention

TABLE 2

| Sample No. | MgO in terms of Mg [mol] | $Tb_2O_3$ α [mol] | $Y_2O_3$ β [mol] | $Yb_2O_3$ γ [mol] | $(Ba,Ca)SiO_3$ a [mol] | MnO in terms of Mn [mol] | $V_2O_5$ in terms of V [mol] | α/β | (α+β)/γ | a/(α+β+γ) | Specific permittivity | CR product [μF·MΩ] | Capacitance-temperature change rate [%] | HALT [h] | Firing temperature |
|---|---|---|---|---|---|---|---|---|---|---|---|---|---|---|---|
| *21 | 1.21 | 2.70 | 0.40 | 1.75 | 3.00 | 0.17 | 0.05 | 6.75 | 1.77 | 0.62 | 1350 | good | −16.3 | 9.9 | good |
| 22 | 1.21 | 1.35 | 0.45 | 1.25 | 2.55 | 0.17 | 0.05 | 3.00 | 1.44 | 0.84 | 1590 | good | −12.9 | 4.1 | good |
| 23 | 1.21 | 1.35 | 1.00 | 1.25 | 2.55 | 0.17 | 0.05 | 1.35 | 1.88 | 0.71 | 1485 | good | −10.8 | 3.3 | good |
| 3 | 1.21 | 0.90 | 0.90 | 1.75 | 3.25 | 0.17 | 0.05 | 1.00 | 1.03 | 0.92 | 1650 | good | −9.3 | 2.3 | good |
| 11 | 1.21 | 1.35 | 2.00 | 1.50 | 3.25 | 0.17 | 0.05 | 0.68 | 2.23 | 0.67 | 1495 | good | −8.5 | 1.9 | good |
| *1 | 1.21 | 1.35 | 4.00 | 1.25 | 4.00 | 0.17 | 0.05 | 0.34 | 4.28 | 0.61 | 1190 | good | −3.8 | 0.2 | good |
| *24 | 1.21 | 1.35 | 0.45 | 2.75 | 3.00 | 0.17 | 0.05 | 3.00 | 0.65 | 0.66 | 740 | good | −7.9 | 0.2 | good |
| 25 | 1.21 | 1.35 | 0.45 | 2.25 | 2.55 | 0.17 | 0.05 | 3.00 | 0.80 | 0.63 | 1560 | good | −9.1 | 2.0 | good |
| 26 | 1.21 | 1.35 | 0.45 | 1.75 | 2.55 | 0.17 | 0.05 | 3.00 | 1.03 | 0.72 | 1555 | good | −10.3 | 4.8 | good |
| 27 | 1.21 | 1.35 | 0.45 | 1.25 | 2.55 | 0.17 | 0.05 | 3.00 | 1.44 | 0.84 | 1580 | good | −13.9 | 7.3 | good |
| 28 | 1.21 | 1.35 | 0.45 | 1.00 | 2.55 | 0.17 | 0.05 | 3.00 | 1.80 | 0.91 | 1610 | good | −14.6 | 17.3 | good |
| 29 | 1.21 | 1.35 | 0.45 | 0.75 | 2.55 | 0.17 | 0.05 | 3.00 | 2.40 | 1.00 | 1685 | good | −14.6 | 21.6 | good |
| *30 | 1.21 | 1.35 | 0.45 | 0.50 | 2.25 | 0.17 | 0.05 | 3.00 | 3.60 | 0.98 | 1830 | good | −18.0 | 46.6 | good |
| *31 | 1.21 | 1.35 | 0.45 | 0.25 | 2.00 | 0.17 | 0.05 | 3.00 | 7.20 | 0.98 | 1915 | good | −19.3 | 47.0 | good |

Samples with "*" denote samples out of the range of the present invention

TABLE 3

| Sample No. | MgO in terms of Mg [mol] | $RA_2O_3$ α [mol] | $RB_2O_3$ β [mol] | $Yb_2O_3$ γ [mol] | $(Ba,Ca)SiO_3$ a [mol] | MnO in terms of Mn [mol] | $V_2O_5$ in terms of V [mol] | α/β | (α+β)/γ | a/(α+β+γ) | Specific permittivity | CR product [μF·MΩ] | Capacitance-temperature change rate [%] | HALT [h] | Firing temperature |
|---|---|---|---|---|---|---|---|---|---|---|---|---|---|---|---|
| 3 | 1.21 | 0.90 (Tb) | 0.90 (Y) | 1.75 | 3.25 | 0.20 | 0.10 | 1.00 | 1.03 | 0.92 | 1650 | good | −9.3 | 2.3 | good |
| 41 | 1.21 | 0.90 (Gd) | 0.90 (Y) | 1.75 | 3.25 | 0.20 | 0.10 | 1.00 | 1.03 | 0.92 | 1590 | good | −13.2 | 3.5 | good |
| 42 | 1.21 | 0.90 (Dy) | 0.90 (Ho) | 1.75 | 3.25 | 0.20 | 0.10 | 1.00 | 1.03 | 0.92 | 1635 | good | −8.8 | 1.5 | good |

From the Tables 1 to 3, when the contents and ratios of the oxide of RA, the oxide of RB and the oxide of Yb were within the range of the present invention, it was confirmed that good high temperature accelerated lifetime was obtained while maintaining the low firing temperature and satisfying X8R characteristic; and furthermore the specific permittivity and the CR product were good. Also, when using other elements other than Tb as RA and Y as RB, respectively, it was still confirmed that similar effect can be obtained.

Example 2

Except for the contents of the respective components were set as the amounts shown in Table 4, and the compositions of the composite oxide were set as compositions shown in Table 4, the multilayer ceramic capacitor samples were made as similar to the example 1 and the characteristic evaluations as similar to the example 1 were performed. The results are shown in Table 4. Note that, it was confirmed that all of the samples in Table 4 satisfied X8R characteristic as the capacitance-temperature characteristic.

TABLE 4

| Sample No. | MgO in terms of Mg [mol] | $Tb_2O_3$ α [mol] | $Y_2O_3$ β [mol] | $Yb_2O_3$ γ [mol] | $(Ba,Ca)SiO_3$ kind | a [mol] | MnO in terms of Mn [mol] | $V_2O_5$ in terms of V [mol] | α/β | (α+β)/γ | a/(α+β+γ) | Specific permittivity | CR product [μF·MΩ] | HALT [h] | Firing temperature |
|---|---|---|---|---|---|---|---|---|---|---|---|---|---|---|---|
| **51 | 0.60 | 1.80 | 1.20 | 2.25 | $(Ba_{0.57}Ca_{0.43})SiO_3$ | 3.00 | 0.17 | 0.03 | 1.50 | 1.33 | 0.57 | 1940 | good | 3.6 | bad |
| 52 | 1.21 | 1.35 | 1.00 | 1.25 | $(Ba_{0.57}Ca_{0.43})SiO_3$ | 2.25 | 0.17 | 0.06 | 1.35 | 1.88 | 0.63 | 1484 | good | 3.3 | good |
| 53 | 1.21 | 1.35 | 0.45 | 0.75 | $(Ba_{0.57}Ca_{0.43})SiO_3$ | 2.55 | 0.17 | 0.06 | 3.00 | 2.40 | 1.00 | 1684 | good | 21.6 | good |
| **54 | 0.60 | 1.35 | 0.45 | 1.25 | $(Ba_{0.57}Ca_{0.43})SiO_3$ | 3.50 | 0.27 | 0.03 | 3.00 | 1.44 | 1.15 | 1654 | good | 1.0 | good |
| 55 | 1.21 | 1.35 | 0.45 | 1.75 | $(Ba_{0.5}Ca_{0.5})SiO_3$ | 2.55 | 0.17 | 0.06 | 3.00 | 1.03 | 0.72 | 1607 | good | 3.6 | good |
| 56 | 1.21 | 1.35 | 0.45 | 1.75 | $BaSiO_3$ | 2.55 | 0.17 | 0.06 | 3.00 | 1.03 | 0.72 | 1546 | good | 3.1 | good |
| 57 | 1.21 | 1.35 | 0.45 | 1.75 | $Ba_{0.6}SiO_{2.6}$ | 2.55 | 0.17 | 0.06 | 3.00 | 1.03 | 0.72 | 1723 | good | 8.6 | good |
| 58 | 1.82 | 1.35 | 1.35 | 1.88 | $(Ba_{0.5}Ca_{0.5})SiO_3$ | 3.83 | 0.17 | 0.06 | 1.00 | 1.44 | 0.84 | 1571 | good | 2.9 | good |
| 59 | 1.82 | 1.35 | 1.35 | 1.88 | $BaSiO_3$ | 3.83 | 0.17 | 0.06 | 1.00 | 1.44 | 0.84 | 1459 | good | 5.3 | good |
| 60 | 1.82 | 1.35 | 1.35 | 1.88 | $Ba_{0.6}SiO_{2.6}$ | 3.83 | 0.17 | 0.06 | 1.00 | 1.44 | 0.84 | 1586 | good | 5.4 | good |

Samples with "**" denote samples out of the preferable range of present invention From the Table 4, when the contents and types of the composite oxides were out of the preferable ranges of the present invention, it was confirmed that the firing temperature was too high or the high temperature accelerated lifetime was deteriorated.

Example 3

Except for setting the contents of the oxide of Mg, the oxide of V and the oxide of Mn as amounts shown in Table 5, the multilayer ceramic capacitor samples were made as similar to the example 1 and the characteristic evaluations as similar to the example 1 were performed. The results are shown in Table 5. Note that, it was confirmed that all of the samples in Table 5 satisfied X8R characteristic as the capacitance-temperature characteristic.

From the Table 6, even when the compositions and the conditions of production were the same, it was confirmed that the capacitance-temperature characteristic and the high temperature accelerated lifetime tends to deteriorate as the interlayer thickness becomes thinner. Particularly, with respect to the high temperature accelerated lifetime, since the voltage applied to the layer per one μm (the electric field intensity) becomes larger due to the thinner interlayer thickness, thus the evaluation conditions becomes extremely strict. As a result, it was confirmed that the high temperature accelerated lifetime becomes extremely deteriorated when making the interlayer thickness thinner.

The invention claimed is:
1. A dielectric ceramic composition comprising:
   a barium titanate as a main component;

TABLE 5

| Sample No. | MgO in terms of Mg [mol] | $Tb_2O_3$ α [mol] | $Y_2O_3$ β [mol] | $Yb_2O_3$ γ [mol] | (Ba,Ca)$SiO_3$ a [mol] | MnO in terms of Mn [mol] | $V_2O_5$ in terms of V [mol] | α/β | (α + β)/γ | a/(α + β + γ) | Specific permittivity | CR product [μF · MΩ] | HALT [h] | Firing temperature |
|---|---|---|---|---|---|---|---|---|---|---|---|---|---|---|
| **71 | 1.21 | 1.35 | 0.45 | 1.25 | 2.55 | 0.07 | 0.03 | 3.00 | 1.44 | 0.84 | 1530 | good | 1.1 | good |
| 72 | 1.21 | 1.35 | 0.45 | 1.25 | 2.55 | 0.12 | 0.06 | 3.00 | 1.44 | 0.84 | 1587 | good | 4.1 | good |
| 73 | 1.21 | 1.35 | 0.45 | 1.25 | 2.55 | 0.27 | 0.06 | 3.00 | 1.44 | 0.84 | 1482 | good | 2.4 | good |
| **74 | 1.21 | 1.35 | 0.45 | 1.25 | 2.55 | 0.37 | 0.06 | 3.00 | 1.44 | 0.84 | 1412 | good | 1.3 | good |
| **75 | 0.60 | 1.35 | 0.45 | 1.75 | 2.55 | 0.17 | 0.00 | 3.00 | 1.03 | 0.72 | 1891 | good | 0.6 | good |
| 76 | 1.21 | 1.35 | 0.45 | 1.75 | 2.55 | 0.17 | 0.03 | 3.00 | 1.03 | 0.72 | 1530 | goad | 2.2 | good |
| 77 | 1.20 | 0.90 | 0.60 | 1.75 | 3.00 | 0.20 | 0.05 | 1.50 | 0.86 | 0.92 | 1713 | good | 3.5 | good |
| 78 | 1.60 | 1.20 | 0.60 | 1.25 | 3.00 | 0.20 | 0.10 | 2.00 | 1.44 | 0.98 | 1557 | good | 5.1 | good |
| **79 | 0.80 | 0.90 | 0.90 | 1.75 | 3.00 | 0.20 | 0.15 | 1.00 | 1.03 | 0.85 | 1669 | bad | 6.9 | good |
| *80 | 0.40 | 1.35 | 0.45 | 1.75 | 2.55 | 0.17 | 0.09 | 3.00 | 1.03 | 0.72 | 1707 | good | 0.3 | bad |
| 81 | 0.60 | 1.35 | 0.45 | 1.75 | 2.55 | 0.17 | 0.09 | 3.00 | 1.03 | 0.72 | 1585 | good | 6.5 | good |
| 82 | 1.21 | 1.35 | 0.45 | 1.75 | 2.55 | 0.17 | 0.06 | 3.00 | 1.03 | 0.72 | 1555 | good | 4.9 | good |
| 83 | 1.91 | 1.58 | 1.58 | 2.19 | 4.46 | 0.17 | 0.06 | 1.00 | 1.44 | 0.84 | 1425 | good | 2.8 | good |
| *84 | 2.20 | 1.35 | 0.68 | 1.88 | 3.83 | 0.26 | 0.09 | 2.00 | 1.08 | 0.98 | 1628 | good | 1.0 | good |

Samples with "*" denote samples out of the range of the present invention
Samples with "**" denote samples out of the preferable range of present invention From the Table 5, when the contents of the oxide of Mg, the oxide of V and the oxide of Mn were out of the preferable ranges of the present invention, it was confirmed that the CR product or the high temperature accelerated lifetime were deteriorated.

Example 4

Except for setting the thicknesses of the dielectric layer (interlayer thickness) to 10 μm, the multilayer ceramic capacitor samples were made as similar to the samples 3, 12 and 13; and the characteristic evaluations as similar to the example 1 were performed. The results are shown in Table 6.

as subcomponents, with respect to 100 moles of said barium titanate,
0.9 to 2.0 moles of an oxide of RA in terms of $RA_2O_3$, where RA is at least one selected from the group consisting of Dy, Gd and Tb;
0.3 to 2.0 moles of an oxide of RB in terms of $RB_2O_3$, where RB is at least one selected from the group consisting of Ho and Y;
0.75 to 2.5 moles of an oxide of Yb in terms of $Yb_2O_3$; and
0.5 to 2.0 moles of an oxide of Mg in terms of Mg,
wherein when contents of said oxide of RA, said oxide of RB and said oxide of Yb with respect to 100 moles of said barium titanate are defined as "α", "β" and "γ",

TABLE 6

| Sample No. | Thickness of interlayer [μm] | MgO in terms of Mg [mol] | $Tb_2O_3$ α [mol] | $Y_2O_3$ β [mol] | $Yb_2O_3$ γ [mol] | (Ba,Ca)$SiO_3$ a [mol] | MnO in terms of Mn [mol] | $V_2O_5$ in terms of V [mol] | α/β | (α + β)/γ | a/(α + β + γ) | Capacitance-temperature change rate [%] | HALT [h] |
|---|---|---|---|---|---|---|---|---|---|---|---|---|---|
| 103 | 10 | 1.21 | 0.90 | 0.90 | 1.75 | 3.25 | 0.17 | 0.05 | 1.00 | 1.03 | 0.92 | −6.7 | >500 |
| *112 | 10 | 2.06 | 0.00 | 0.00 | 4.26 | 3.00 | 0.38 | 0.50 | — | 0.00 | 0.70 | −3.8 | 102.8 |
| *113 | 10 | 2.06 | 0.00 | 2.00 | 2.00 | 3.00 | 0.38 | 0.01 | — | 1.00 | 0.75 | −9.2 | 220.0 |
| 3 | 5 | 1.21 | 0.90 | 0.90 | 1.75 | 3.25 | 0.17 | 0.05 | 1.00 | 1.03 | 0.92 | −9.3 | 2.3 |
| *12 | 5 | 2.06 | 0.00 | 0.00 | 4.26 | 3.00 | 0.38 | 0.50 | — | 0.00 | 0.70 | −5.2 | 0.1≧ |
| *13 | 5 | 2.06 | 0.00 | 2.00 | 2.00 | 3.00 | 0.38 | 0.01 | — | 1.00 | 0.75 | −11.1 | 0.3 |

Samples with "*" denote samples out of the range of the present invention respectively, said "α", "β" and "γ" satisfy relations of $0.66 \leq (\alpha/\beta) \leq 3.0$ and $0.8 \leq (\alpha+\beta)/\gamma \leq 2.4$.

2. The dielectric ceramic composition as set forth in claim 1 further comprising, as a subcomponent, 0.03 to 0.10 mole of an oxide of V in terms of V with respect to 100 moles of said barium titanate.

3. The dielectric ceramic composition as set forth in claim 2 further comprising, as a subcomponent, 0.10 to 0.30 mole of an oxide of Mn in terms of Mn with respect to 100 moles of said barium titanate.

4. The dielectric ceramic composition as set forth in claim 2 further comprising, as a subcomponent, 0.60 $(\alpha+\beta+\gamma)$ to 1.0 $(\alpha+\beta+\gamma)$ moles of a composite oxide shown by a compositional formula $(Ba, Ca)_x SiO_{2+x}$ in terms of $SiO_2$ with respect to 100 moles of said barium titanate, wherein "x" in said compositional formula is 0.5 to 1.0.

5. The dielectric ceramic composition as set forth in claim 3 further comprising, as a subcomponent, 0.60 $(\alpha+\beta+\gamma)$ to 1.0 $(\alpha+\beta+\gamma)$ moles of a composite oxide shown by a compositional formula $(Ba, Ca)_x SiO_{2+x}$ in terms of $SiO_2$ with respect to 100 moles of said barium titanate, wherein "x" in said compositional formula is 0.5 to 1.0.

6. The dielectric ceramic composition as set forth in claim 1 further comprising, as a subcomponent, 0.10 to 0.30 mole of an oxide of Mn in terms of Mn with respect to 100 moles of said barium titanate.

7. The dielectric ceramic composition as set forth in claim 6 further comprising, as a subcomponent, 0.60 $(\alpha+\beta+\gamma)$ to 1.0 $(\alpha+\beta+\gamma)$ moles of a composite oxide shown by a compositional formula $(Ba, Ca)_x SiO_{2+x}$ in terms of $SiO_2$ with respect to 100 moles of said barium titanate, wherein "x" in said compositional formula is 0.5 to 1.0.

8. The dielectric ceramic composition as set forth in claim 1 further comprising, as a subcomponent, 0.60 $(\alpha+\beta+\gamma)$ to 1.0 $(\alpha+\beta+\gamma)$ moles of a composite oxide shown by a compositional formula $(Ba, Ca)_x SiO_{2+x}$ in terms of $SiO_2$ with respect to 100 males of said barium titanate, wherein "x" in said compositional formula is 0.5 to 1.0.

9. The dielectric ceramic composition as set forth in claim 1, wherein said RA is Tb.

10. The dielectric ceramic composition as set forth in claim 1, wherein said RB is Y.

11. A ceramic electronic component comprising a dielectric layer composed of said dielectric ceramic composition as set forth in claim 1 and an electrode, wherein a thickness of said dielectric layer is 5.0 µm or less.

* * * * *